M. E. BISHOP.
HANDLE FOR VARIOUS ARTICLES.
APPLICATION FILED FEB. 4, 1920.
1,338,968.
Patented May 4, 1920.
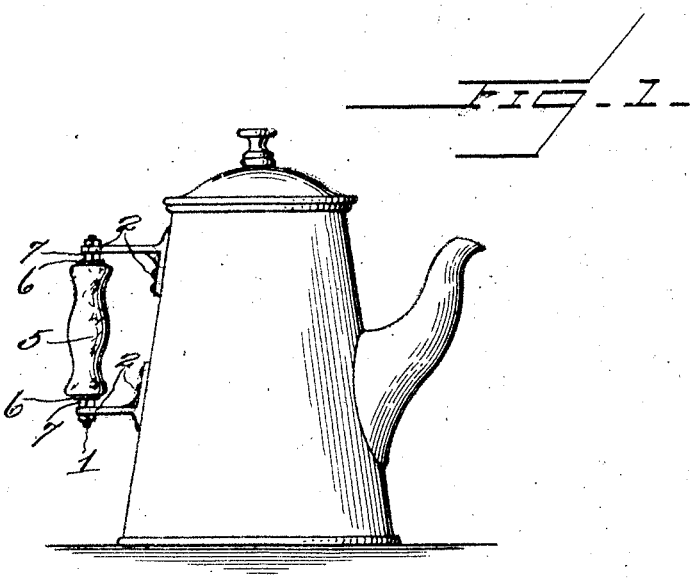
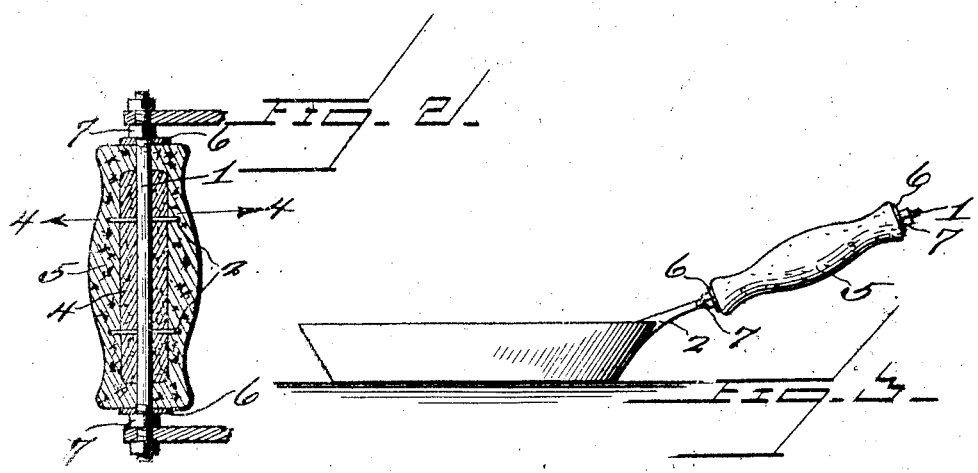
Inventor
Merle E. Bishop,
By Watson E. Coleman,
Attorney

UNITED STATES PATENT OFFICE.

MERLE E. BISHOP, OF HEYWORTH, ILLINOIS.

HANDLE FOR VARIOUS ARTICLES.

1,338,968.     Specification of Letters Patent.     Patented May 4, 1920.

Application filed February 4, 1920. Serial No. 356,132.

*To all whom it may concern:*

Be it known that I, MERLE E. BISHOP, a citizen of the United States, residing at Heyworth, in the county of McLean and State of Illinois, have invented certain new and useful Improvements in Handles for Various Articles, of which the following is a specification, reference being had to the accompanying drawings.

This invention relates to an improved handle for various articles, such as tea and coffee pots, stove lifters, skillets, kettles and various other similar articles, and as an object of the invention it is the aim to provide a handle which will not become too highly heated by the heat from the article, thereby permitting the handle to be grasped and the tea pot or other article readily lifted without burning the hand.

Another object of the invention is to provide a handle support projecting from the wall of the tea or coffee pot or other article, or may constitute the handle of a lifter or the like, having means for holding a combined asbestos and cork handle in place, the asbestos being on the interior of the handle, while the cork is on the exterior. It has been found that in constructing a device in this manner, the interior asbestos acts to condense the heat in which case the cork exterior of the handle will not become excessively heated, in such a manner that the handle could not be grasped with comfort.

A further object of the invention is to provide a handle which is substantial in construction and very simple, and which can be produced for a relatively low cost and sold at a reasonable profit.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in elevation showing the improved handle as applied to a tea or coffee pot which may be any suitable construction, Fig. 2 is a vertical sectional view through the handle showing the same as applied to the kettle, Fig. 3 is a view in elevation showing the handle as applied to a skillet, and Fig. 4 is a cross sectional view on line 4—4 of Fig. 2.

Referring to the drawings 1 designates a bar or rod, which may be fastened in any suitable manner as at 2 to a tea or coffee pot 3. However, this rod or bar 1 may constitute a part of a skillet or pan or part of a lifter.

Extending transversely of the rod or bar are holding pins $2^a$. Formed or constructed in any suitable manner on the greater part of the bar or rod 1 is an interior asbestos filler 4. This filler of asbestos is formed in any suitable manner about the rod or bar and about the transverse pins 2, and constitutes means for materially resisting the heat. The asbestos filler 4 is of considerable thickness, in order to insure resisting the heat and the transverse pins 2 act to prevent longitudinal movement of the filler. Furthermore due to the high coefficient thermal resistance of the heat resisting material which is the same as saying that the material has a low coefficient of thermal conductivity, the device provides that, though the asbestos itself be at a high temperature, the effect upon the hand of the operator will not be largely influenced thereby, as it would if the substance forming the interior filler of the handle should be of some material having a high coefficient of conductivity. Surrounding the filler 4 is a heavy coating of cork 5, which by means of the asbestos filler, is insulated from the rod or bar 1. It has been found that a handle of this character for use in connection with cooking utensils such as tea and coffee pots, skillets and kettles, as well as lifters, will remain comparatively cool, and may be easily handled without discomfort. Suitable washers 6 are mounted upon the rod 1 adjacent the ends of the handle, there being nuts 7 engaging the rod, to hold the washers in place and to coöperate with the transverse pins 2 to prevent longitudinal movement of the handle.

The invention having been set forth, what is claimed as new and useful is:

1. In a handle of the kind set forth, the combination with a rod, of a handle on said rod comprising an interior filler of heat resisting material in surrounding relation to the rod, means mounted transversely of the rod and passing transversely through the heat resisting material, a fibrous cover constructed in surrounding relation to the filler and in engagement with the ends of the filler, means on the ends of the rod engaging against the cover, assisting in holding the same in place, said means passing through the rod also extending beyond the filler and engaging the cover, thereby preventing axial movement of the filler before applying the cover and also preventing rotary movement of the filler and the cover relatively with each other and with relation to the rod.

2. In a handle as set forth, a rod, a handle operatively mounted thereon comprising an interior filler of heat resisting material, the rod extending beyond the ends of said filler, a fibrous coating in surrounding relation to the filler and engaging the extended ends of the rod, whereby the coating may engage over the ends of the filler, hence assisting in holding the filler in position, and elements extending transversely through the rod and through the filler and projecting into the coating to prevent rotary movement of the filler and the coating relatively to each other and with respect to the rod.

3. In a handle as set forth, a rod, a handle thereon, comprising an interior asbestos filler in surrounding coöperative engagement with the rod, said rod having its end protruding beyond them into the filler, a cork coating in surrounding relation to the filler and overlying the ends thereof in engagement with the ends of the rod, means on the ends of the rod coöperatively engaging the coating to assist in holding the handle in place, and pins extending transversely of the rod and the filler and projecting into the cork coating to prevent relative rotative movement of the filler and the coating with relation to each other and respectively with the rod, and acting to prevent longitudinal movement of the filler relative to the rod prior to applying the coating.

In testimony whereof I hereunto affix my signature.

MERLE E. BISHOP.